US012571453B2

(12) United States Patent
Lv

(10) Patent No.: US 12,571,453 B2
(45) Date of Patent: *Mar. 10, 2026

(54) DRIVING MECHANISM FOR ROTATING PHOTO BOOTH

(71) Applicant: Shenzhen Vanplex Co., Ltd, Shenzhen (CN)

(72) Inventor: Hongwen Lv, Shenzhen (CN)

(73) Assignee: Shenzhen Vanplex Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,624

(22) Filed: Oct. 18, 2024

(65) Prior Publication Data

US 2025/0043848 A1 Feb. 6, 2025

(30) Foreign Application Priority Data

Sep. 11, 2024 (CN) .......................... 202422228912.6

(51) Int. Cl.
 *F16H 1/10* (2006.01)
 *F16H 1/06* (2006.01)
 *F16H 7/02* (2006.01)
(52) U.S. Cl.
 CPC ................. *F16H 1/10* (2013.01); *F16H 1/06* (2013.01); *F16H 7/02* (2013.01)
(58) Field of Classification Search
 CPC ......... G03B 17/561; F16M 11/18; F16H 1/10; F16H 1/06; F16H 7/02
 See application file for complete search history.

(56) References Cited

U.S. PATENT DOCUMENTS

| | | | | | |
|---|---|---|---|---|---|
| 2,448,084 | A | * | 8/1948 | Davis | G03B 35/04 |
| | | | | | 396/419 |
| 4,372,659 | A | * | 2/1983 | Ogawa | G03B 15/00 |
| | | | | | 396/24 |
| 9,641,730 | B2 | * | 5/2017 | Rosenberry | F16M 13/00 |
| 11,719,380 | B1 | * | 8/2023 | Wang | F16M 11/08 |
| | | | | | 108/20 |
| 11,720,000 | B1 | * | 8/2023 | Huang | G03B 37/02 |
| | | | | | 362/8 |
| 11,852,955 | B2 | * | 12/2023 | Zhang | G03B 17/561 |
| 12,001,122 | B2 | * | 6/2024 | Xiao | G03B 21/58 |
| 12,013,078 | B2 | * | 6/2024 | Hou | F16M 11/18 |
| 2015/0228034 | A1 | | 8/2015 | Alderman et al. | |
| 2018/0268496 | A1 | | 9/2018 | Alderman et al. | |
| 2023/0269480 | A1 | * | 8/2023 | Hou | F16M 11/18 |
| | | | | | 348/129 |
| 2024/0011598 | A1 | | 1/2024 | Hou | |

* cited by examiner

*Primary Examiner* — Jake Cook
(74) *Attorney, Agent, or Firm* — Hemisphere Law, PLLC

(57) ABSTRACT

A driving mechanism for a rotating photo booth, includes a driving motor, and a rotating connecting portion driven by the driving motor and capable of rotating 360 degrees. An output shaft of the driving motor is connected to the rotating connecting portion by gear drive or a belt, thus driving the rotating connecting portion to rotate. The driving mechanism further includes a drive bearing for power transmission. The rotating connection portion is in fit connection with an outer ring or inner ring of the drive bearing. The driving motor is arranged on an inner side or outer side of the drive bearing. In practical application, the driving stability of the device in the running process can be better improved, and the reliability of power transmission can be enhanced.

10 Claims, 6 Drawing Sheets

DRIVING MECHANISM FOR ROTATING PHOTO BOOTH

TECHNICAL FIELD

The present disclosure relates to the technical field of rotating photo booth products, and in particular to a driving mechanism for a rotating photo booth with high operation stability and high reliability.

BACKGROUND

As is well known, the 360-degree photo booth, also known as 360 photo booth, is a platform for 360-degree shooting, which, compared with ordinary self-timer prod- ucts, has a further entertainment experience in terms of application effect. Moreover, through such an apparatus, a photographed subject can stand on the supporting table and is photographed by rotating the rotatable shooting bracket, and the experience and the interest of shooting of the user are greatly enriched in actual use.

The structural construction of the existing photo booth products is mainly formed by connecting the supporting stage and the supporting base with a central shaft in the middle. The driving mechanism at the inner side is generally arranged close to the central shaft, and a shooting bracket structure is driven by means of meshing drive to achieve 360-degree rotation. In practical application, especially when holding events, 3-6 people or more can stand on the supporting stage. If there are many people, they will stand around the edge of the supporting stage, often leading to the deformation of the supporting stage because the edge of the supporting stage is too far away from the central shaft to support the stage. Secondly, Because the power and gravity generated by the jumping or large-scale action of the user on the supporting stage can only be supported by the central shaft, the concentration of the bearing force on the central shaft often results in loosening or even desoldering or fracture of the central shaft, the supporting stage and the central shaft, which greatly increases the danger in use. Moreover, the arrangement of the above rotating and sup- porting structure also limits the arrangement of the driving mechanism to a certain extent.

For example, in the invention patent with the patent number of CN202221031966.8 and entitled "360-degree camera device having atmosphere lamp", a 360-degree camera device having atmosphere lamp is provided, includ- ing a supporting stage, a supporting spindle, a supporting base and a rotating shooting bracket. The supporting stage includes a first supporting element, tempered glass, a first light source, and a reflecting mirror. The first supporting element is used for supporting the tempered glass. The tempered glass is single-sided perspective glass including a light-transmitting surface and a reflecting surface. An inter- val area is arranged between the tempered glass and the reflecting mirror. The reflecting mirror and the reflecting surface are oppositely arranged. The first light source is disposed in the interval area. The first light source is in a shape of graphics and/or characters. The first light source includes a plurality of point-shaped light-emitting parts, and the first light source is substantially arranged in an annular shape and arranged along edge contour of the tempered glass or the reflecting mirror. The supporting stage includes a second supporting element, the second supporting element is used for supporting a central position of the tempered glass, and the first supporting element is used for supporting an edge position of the tempered glass.

In the above prior art patent document, an independent intermediate rotating shaft structure is adopted, the driving mechanism is mounted on the outer side of the central shaft, and the related components are driven to rotate axially by meshing drive. With the structure of such a supporting and driving mechanism, it is prone to stage deviation and unstable standing during practical application, which affects the practical application.

Therefore, there is an urgent need to improve the structure of the existing technology and adjust the matching structure from the driving mechanism, supporting structure and other parts.

SUMMARY

The problem in the prior art solved by the present dis- closure is as follows.

The structural construction of the existing photo booth products is mainly formed by connecting the supporting stage and the supporting base with a central shaft in the middle. The driving mechanism at the inner side is generally arranged close to the central shaft, and a shooting bracket structure is driven by means of meshing drive to achieve 360-degree rotation. In practical application, especially when holding events, 3-6 people or more can stand on the supporting stage. If there are many people, they will stand around the edge of the supporting stage, often leading to the deformation of the supporting stage because the edge of the supporting stage is too far away from the central shaft to support the stage. Moreover, the arrangement of the above rotating and supporting structure also limits the arrangement of the driving mechanism to a certain extent.

The solution adopted by the present disclosure for solving the technical problem is as follows:

A driving mechanism for a rotating photo booth includes a driving motor, and a rotating connecting portion driven by the driving motor and capable of rotating 360 degrees.

An output shaft of the driving motor is connected to the rotating connecting portion by gear drive or a belt, thus driving the rotating connecting portion to rotate.

The driving mechanism further includes a drive bearing for power transmission, and the rotating connecting portion is in fit connection with an outer ring or inner ring of the drive bearing.

The driving motor is mounted on an inner side or outer side of the drive bearing.

Preferably, the driving mechanism for a rotating photo booth further includes a drive ring gear in fit connection with the outer ring or inner ring of the drive gear. The rotating connecting portion is in fit connection with the drive ring gear.

The output shaft of the driving motor is in fit connection with the drive ring gear through gear meshing, thus driving the drive ring gear and the rotating connecting portion to make circumferential rotation.

Preferably, the output shaft of the driving motor is in fit connection with the outer ring or inner ring of the drive bearing by a drive belt, thus driving the drive ring gear to operate, and synchronously driving the rotating connecting portion to make circumferential rotation.

Preferably, the rotating connecting portion is of an arc or annular structure and is fixedly connected to the drive ring gear by a screws or welding.

Preferably, a belt connecting groove for sleeving the drive belt is circumferentially formed in the outer ring or inner ring of the drive bearing. The rotating connecting portion is of an arc or annular structure, and is fixedly connected to the outer ring or inner ring of the bearing by a screw or welding.

Preferably, a rotating connecting rod for arranging an external shooting bracket is further connected to an outer side of the rotating connecting portion.

Preferably, a lower portion of the driving motor is provided with a motor mounting plate for fixing the driving motor.

The technical effects produced by solving the technical problem by the present disclosure are as follows:

According to the present disclosure, by providing a driving motor 11, and a rotating connecting portion 15 driven by the driving motor 11 and capable of rotating 360 degrees, an output shaft of the driving motor 11 is connected to the rotating connecting portion 15 by gear drive or a belt, thus driving the rotating connecting portion 15 to rotate. The driving mechanism further includes a drive bearing for power transmission. The rotating connection portion 15 is in fit connection with an outer ring 16 or inner ring 14 of the drive bearing. The driving motor 11 is arranged on an inner side or outer side of the drive bearing. In practical application, the driving stability of the device in the running process can be better improved, and the reliability of power transmission can be enhanced.

DETAILED DESCRIPTION OF THE EMBODIMENTS

In order to make the objectives, technical solutions and advantages of the present disclosure more clearly, the present disclosure is further described in detail below with reference to the accompanying drawings and embodiments.

It should be understood that specific embodiments described here are only used to illustrate rather than limiting the present disclosure.

All other embodiments obtained by those of ordinary skill in the art based on the embodiments of the present disclosure without creative efforts shall fall within the scope of protection of the present disclosure.

It should be noted that when an assembly is said to be "fixed" to another assembly, it can be directly on another assembly or there may be an intervening assembly. When an assembly is said to be "connected" to another assembly, it can be directly connected to another assembly or there may be an intervening assembly.

Unless otherwise defined, all technical and scientific terms used herein have the same meaning as commonly understood by those skilled in the art of the present disclosure.

The terminology used in the description of the present disclosure herein is only for the purpose of describing specific embodiments and is not intended to limit the present disclosure. It may be understood that the term "and/or" used herein refers to and covers any and all possible combinations of one or more of the associated listed items.

Some embodiments of the present disclosure are further described below in detail with reference to the accompanying drawings. It should be noted that the following embodiments and features in the embodiments may be combined with each other without causing conflict.

Figure 1:
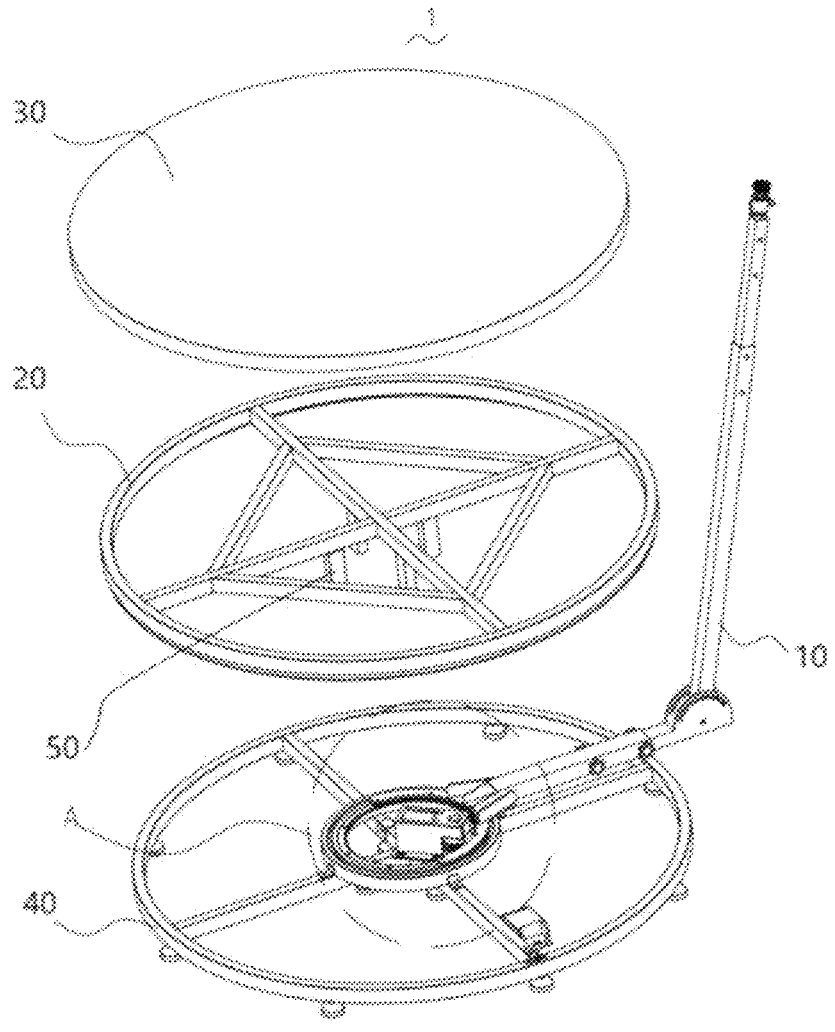
FIG. 1 is a schematic structural diagram of a three-dimensional state of a driving mechanism for a rotating photo booth according to Embodiment 1 of the present disclosure.
Figure 2:
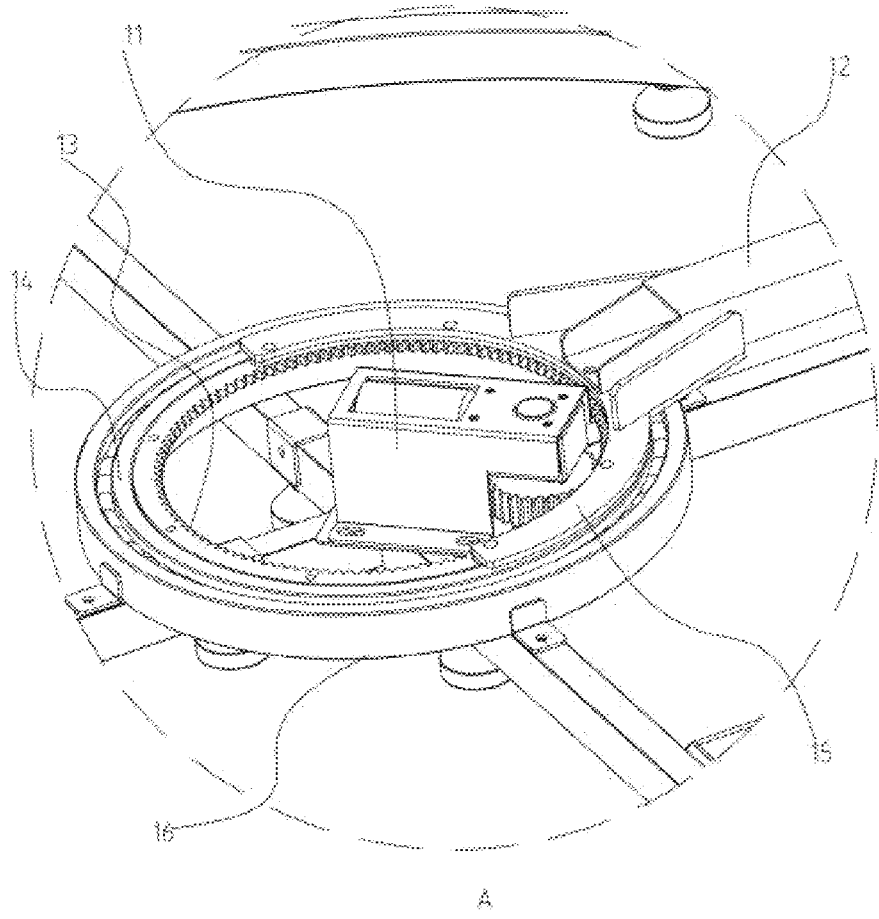
FIG. 2 is an enlarged diagram of part A in FIG. 1.

Please referring to FIG. 1 and FIG. 2, a driving mechanism 1 for a rotating photo booth according to Embodiment 1 of the present disclosure includes a driving motor 11, and a rotating connecting portion 15 driven by the driving motor 11 and capable of rotating 360 degrees.

An output shaft of the driving motor 11 is connected to the rotating connecting portion 15 by gear drive or a belt, thus driving the rotating connecting portion 15 to rotate.

The driving mechanism further includes a drive bearing for power transmission. The rotating connecting portion 15 is in fit connection with an outer ring 16 or inner ring 14 of the drive bearing.

The driving motor 11 is mounted on an inner side or outer side of the drive bearing.

According to the present disclosure, by providing a driving motor 11, and a rotating connecting portion 15 driven by the driving motor 11 and capable of rotating 360 degrees, an output shaft of the driving motor 11 is connected to the rotating connecting portion 15 by gear drive or a belt, thus driving the rotating connecting portion 15 to rotate. The driving mechanism further includes a drive bearing for power transmission. The rotating connection portion 15 is in fit connection with an outer ring 16 or inner ring 14 of the drive bearing. The driving motor 11 is arranged on an inner side or outer side of the drive bearing. In practical application, the driving stability of the device in the running process can be better improved, and the reliability of power transmission can be enhanced.

In some embodiments, the driving mechanism 1 for a rotating photo booth further includes a drive ring gear 13 in fit connection with the outer ring 16 or inner ring 14 of the drive gear. The rotating connecting portion 15 is in fit connection with the drive ring gear 13.

In practical design, the rotating connecting portion 15 may be of a circular arc structure or square frame structure, which is mainly fixedly connected to the drive ring gear 13, and no interference is generated in the rotation.

The output shaft of the driving motor 11 is in fit connection with the drive ring gear 13 through gear meshing, thus driving the drive ring gear 13 and the rotating connecting portion 15 to make circumferential rotation.

The rotating connecting portion 15 is of an arc or annular structure, and fixedly connected to the drive ring gear 13 by a screw or welding.

A rotating connecting rod 12 for arranging an external shooting bracket 10 is further connected to an outer side of the rotating connecting portion 15. In addition, referring again to FIG. 1, the driving mechanism 1 for the rotating photo booth further includes a support base 40, the driving motor 11 and the drive bearing with the outer ring 16 and inner ring 14 are positioned on the support base 40. The driving mechanism 1 for the rotating photo booth further includes a platform frame 20 and a platform cover plate 30, the platform frame 20 is mounted on the support base 40, a plurality of support rods 50 (also see FIG. 5 and FIG. 6) are positioned between the support base 40 and the platform frame 20, and protrudes from the support base 40 to abut on the platform frame 20, and the platform cover plate 30 covers the platform frame 20, thereby forming a platform for the rotating photo booth.

Figure 3:
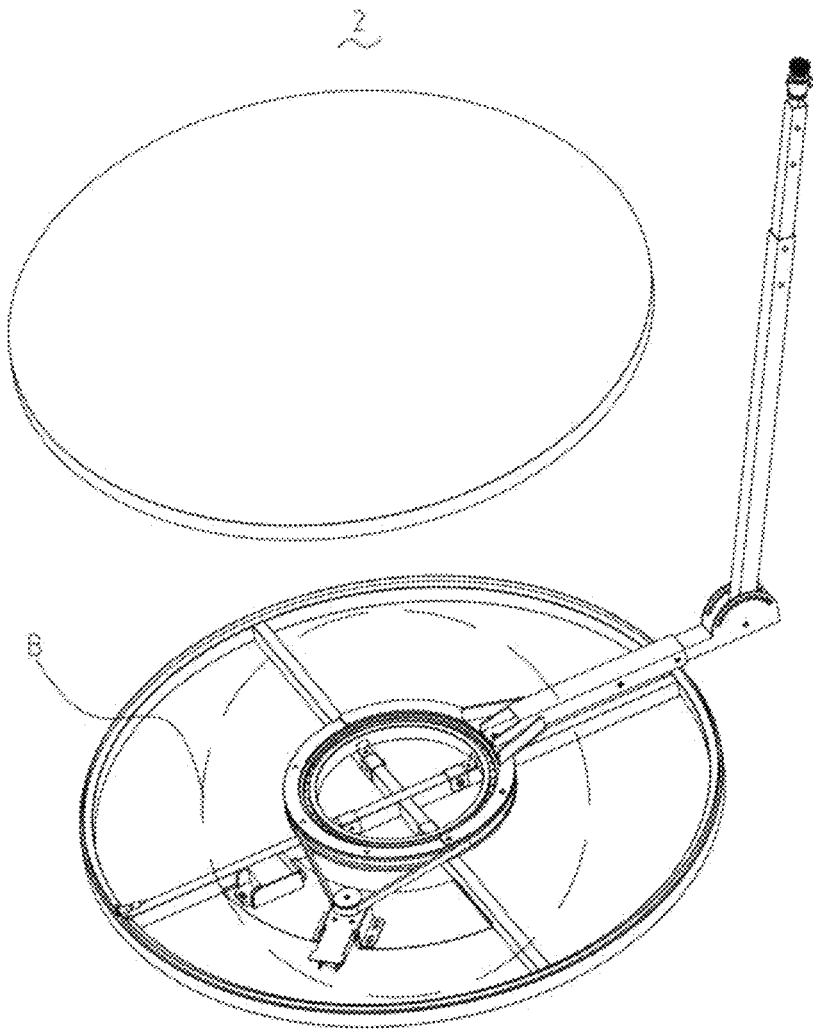
FIG. 3 is a schematic structural diagram of a three-dimensional state of a driving mechanism for a rotating photo booth according to Embodiment 2 of the present disclosure.
Figure 4:
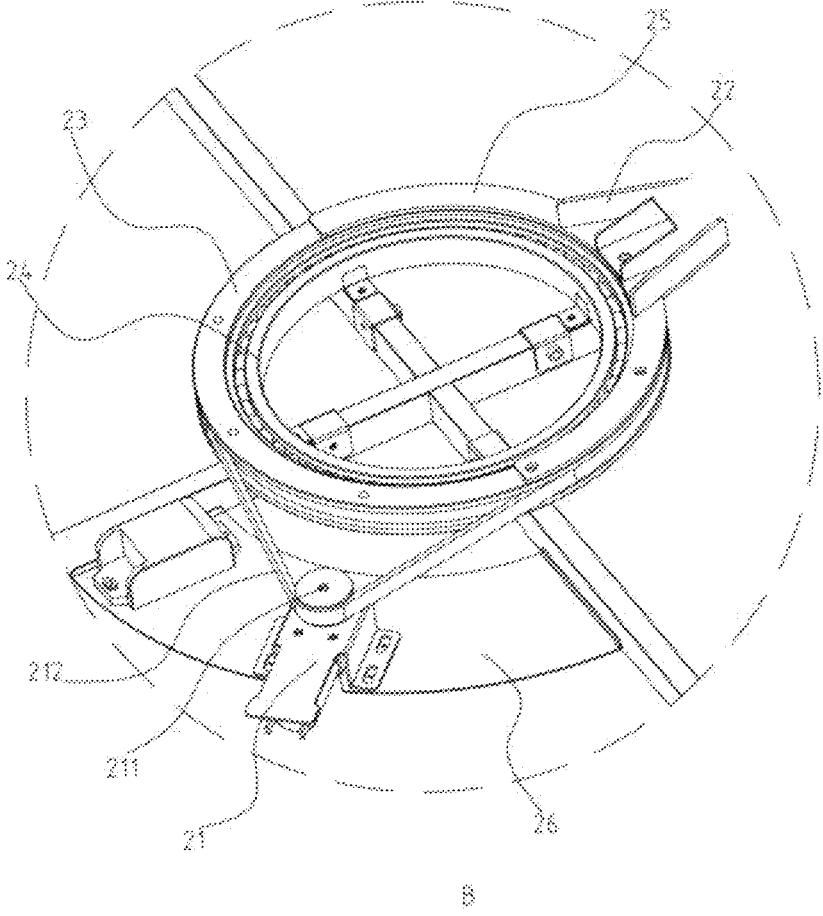
FIG. 4 is an enlarged diagram of part B in FIG. 1.

Please referring to FIG. 3 and FIG. 4, the difference between a driving mechanism 2 for a rotating photo booth 2 in Embodiment 2 of the present disclosure is different from that in Embodiment 1 mainly in the driving structure, which is as follows:

An output shaft 211 of a driving motor 21 is connected to an outer ring 23 or inner ring 24 of a drive bearing through a drive belt 212, thus driving the drive bearing to operate and synchronously driving a rotating connecting portion 25 to make circumferential rotation.

A belt connecting groove for sleeving the drive belt 212 is circumferentially formed in the outer ring 23 or inner ring 24 of the drive bearing. The rotating connecting portion 25 is of an arc or annular structure, and is fixedly connected to the outer ring 23 or inner ring 24 of the bearing by a screw or welding.

A lower portion of the driving motor 21 is provided with a motor mounting plate 26 for fixing the driving motor 21.

Figure 5:
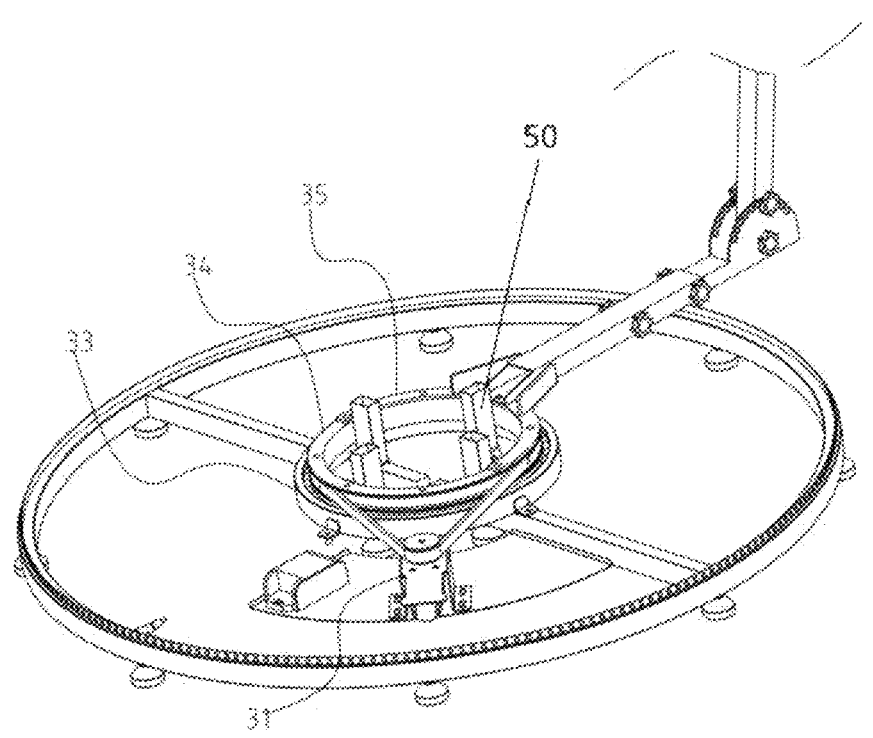
FIG. 5 is a schematic structural diagram of a three-dimensional state of a driving mechanism for a rotating photo booth according to Embodiment 3 of the present disclosure.

Please referring to FIG. 5, in Embodiment 3 of the present disclosure, an inner ring 34 of the drive bearing extends to an upper portion by a certain distance, and a protruded annular structure for transmission connection may also be additionally connected to an upper side of the inner ring 34, which also belongs to the equivalent technical solution.

A driving motor 31 is directly sleeved on the inner ring 34 of the bearing through a drive belt to form a difference from Embodiment 2.

The rotating connecting portion 35 is fixedly connected to the inner ring 34 of the bearing.

An outer ring 33 of the bearing is fixed to an external frame.

Figure 6:
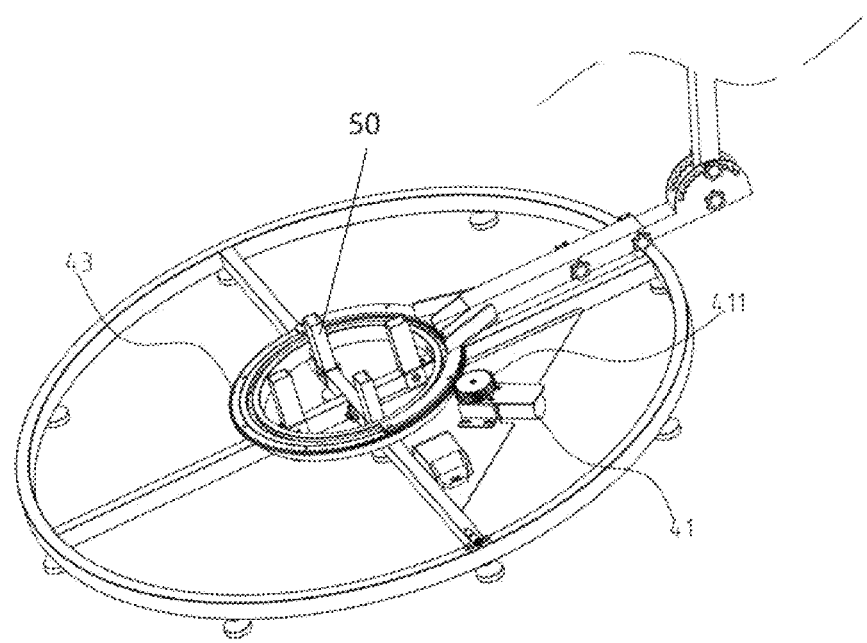
FIG. 6 is a schematic structural diagram of a three-dimensional state of a driving mechanism for a rotating photo booth according to Embodiment 4 of the present disclosure.

Please referring to FIG. 6, in Embodiment 4 of the present disclosure, the drive ring gear 43 is arranged on an outer side of the outer ring of the bearing, an output shaft 411 of the driving motor 41 is directly meshed with the drive ring gear 43 on the outer side for power transmission to form a difference from Embodiment 1.

The technical effects produced by solving the technical problem by the present disclosure are as follows:

Compared with the prior art, a driving mechanism 1 for a rotating photo booth is provided with a driving motor 11, and a rotating connecting portion 15 driven by the driving motor 11 and capable of rotating 360 degrees. An output shaft of the driving motor 11 is connected to the rotating connecting portion 15 by gear drive or a belt, thus driving the rotating connecting portion 15 to rotate. The driving mechanism further includes a drive bearing for power transmission. The rotating connection portion 15 is in fit connection with an outer ring 16 or inner ring 14 of the drive bearing. The driving motor 11 is arranged on an inner side or outer side of the drive bearing. In practical application, the driving stability of the device in the running process can be better improved, and the reliability of power transmission can be enhanced.

The above is only the embodiments of the present disclosure, and the scope of protection of the present disclosure is not limited to the above embodiments. Any modification, equivalent replacement, improvement, etc. made within the spirit and principle of the present disclosure should be included in the scope of protection of the present disclosure.

What is claimed is:

1. A driving mechanism for a rotating photo booth with a platform cover plate, comprising:

a driving motor, and a rotating connecting portion driven by the driving motor and capable of rotating 360 degrees, wherein an output shaft of the driving motor is connected to the rotating connecting portion by gear drive or a belt, thus driving the rotating connecting portion to rotate;

a drive bearing for power transmission, wherein the drive bearing comprises an outer ring and an inner ring, and the rotating connecting portion is in connection with the outer ring or inner ring of the drive bearing; and the driving motor is mounted on an inner side or outer side of the drive bearing;

a support base and a plurality of supporting rods, wherein the supporting rods are positioned on the support base, inside of the inner ring, and protruding from the support base, the supporting rods are configured for cooperatively supporting the platform cover plate.

2. The driving mechanism for a rotating photo booth according to claim 1, further comprising a drive ring gear in connection with the outer ring or inner ring of the drive bearing, wherein the rotating connecting portion is in connection with the drive ring gear; and the output shaft of the driving motor is in connection with the drive ring gear through gear meshing, thus driving the drive ring gear and the rotating connecting portion to make rotation.

3. The driving mechanism for a rotating photo booth according to claim 1, wherein the output shaft of the driving motor is in connection with the outer ring or inner ring of the drive bearing by the belt, thus driving the drive ring gear to operate, and synchronously driving the rotating connecting portion to make rotation.

4. The driving mechanism for a rotating photo booth according to claim 2, wherein the rotating connecting portion is of an arc structure and is fixedly connected to the drive ring gear by a screw or welding.

5. The driving mechanism for a rotating photo booth according to claim 3, wherein a groove is formed between the outer ring and inner ring; a belt connecting groove for sleeving the belt is circumferentially formed in an outer surface of the outer ring or in an outer surface of the inner ring of the drive bearing; and the rotating connecting portion is of an arc or annular structure, and is fixedly connected to the outer ring or inner ring of the drive bearing by a screw or welding.

6. The driving mechanism for a rotating photo booth according to claim 1, wherein a rotating connecting rod for arranging an external shooting bracket is further connected to an outer side of the rotating connecting portion.

7. The driving mechanism for a rotating photo booth according to claim 1, wherein a lower portion of the driving motor is provided with a motor mounting plate for fixing the driving motor.

8. The driving mechanism for a rotating photo booth according to claim 1, wherein the driving motor and the drive bearing with the outer ring and inner ring are also positioned on the support base.

9. The driving mechanism for a rotating photo booth according to claim 8, wherein the rotating photo booth further comprises a platform frame, the supporting rods are positioned between the support base and the platform frame, and abut on the platform frame, and the platform cover plate covers the platform frame, thereby forming a platform for the rotating photo booth.

10. The driving mechanism for a rotating photo booth according to claim 9, wherein the supporting rods are spaced apart from each other, and perpendicular to each of the platform frame, the support base and the platform cover plate.

\* \* \* \* \*